United States Patent
Bastide et al.

(10) Patent No.: US 9,885,316 B2
(45) Date of Patent: Feb. 6, 2018

(54) ACTUATING DEVICE INCLUDING A PRIMARY LOCKING DEVICE

(71) Applicant: Sagem Defense Securite, Boulogne-Billancourt (FR)

(72) Inventors: Christophe Bastide, Boulogne-Billancourt (FR); Rinaldo Fadini, Boulogne-Billancourt (FR)

(73) Assignee: Sagem Defense Securite, Boulogne-Billancourt (FR)

( * ) Notice: Subject to any disclaimer, the term of this patent is extended or adjusted under 35 U.S.C. 154(b) by 379 days.

(21) Appl. No.: 14/434,334

(22) PCT Filed: Oct. 8, 2013

(86) PCT No.: PCT/EP2013/070946
§ 371 (c)(1),
(2) Date: Apr. 8, 2015

(87) PCT Pub. No.: WO2014/056913
PCT Pub. Date: Apr. 17, 2014

(65) Prior Publication Data
US 2015/0233322 A1    Aug. 20, 2015

(30) Foreign Application Priority Data
Oct. 8, 2012 (FR) ...................................... 12 59558

(51) Int. Cl.
*F02K 1/76* (2006.01)
*F16H 25/24* (2006.01)

(52) U.S. Cl.
CPC ......... *F02K 1/766* (2013.01); *F16H 25/2454* (2013.01); *Y10T 74/18688* (2015.01); *Y10T 74/20636* (2015.01)

(58) Field of Classification Search
CPC .............................. F02K 1/766; F16H 25/2454
See application file for complete search history.

(56) References Cited

U.S. PATENT DOCUMENTS

2006/0042229 A1* 3/2006 Hanlon .................. F02K 1/766
                                                                60/226.2
2010/0156057 A1    6/2010 Blondelet et al.
(Continued)

FOREIGN PATENT DOCUMENTS

CN        101631963 A      1/2010
FR        2 916 413       11/2008
(Continued)

OTHER PUBLICATIONS

English translation of Office Action in Chinese Application No. 201380062924.8 dated Jan. 18, 2016. 4 pages.

*Primary Examiner* — Terence Boes
(74) *Attorney, Agent, or Firm* — Blakely Sokoloff Taylor & Zafman; Eric S. Hyman (57) ABSTRACT

The invention relates to an actuating device comprising: —a first element (7), —a second element (8) able to move translationally with respect to the first element (7), and —a locking device (6) comprising a catch (18, 20) able to move between a deployed position and a retracted position, the catch (18-20) being positioned with respect to the first element (7) in such a way that when the catch (18-20) is in a deployed position, the catch (18-20) allows the second element (8) to move with respect to the first element (7) in a first range of movement (A) and prevents the second element (8) from moving with respect to the first element (7) in a second range of movement (B), and when the catch (18-20) is in the retracted position, the catch (18-20) allows the second element to move with respect to the first element (7) in the second range of movement (B). This device is particularly suited to allowing actuation of a thrust reverser system and of a system that regulates air flow through an aircraft propulsion unit.

16 Claims, 7 Drawing Sheets (56) References Cited

U.S. PATENT DOCUMENTS

2013/0292489 A1* 11/2013 Vauchel .................... F02K 1/09
                                                    239/265.19
2013/0312387 A1* 11/2013 West ........................ F02K 1/09
                                                    60/226.2

FOREIGN PATENT DOCUMENTS

| GB | 2 319 810 | 6/1998 |
|----|-----------|--------|
| WO | WO-94/07018 | 3/1994 |
| WO | WO 2008114468 A1 | 9/2008 |
| WO | WO-2008/123166 | 10/2008 |

* cited by examiner

ACTUATING DEVICE INCLUDING A PRIMARY LOCKING DEVICE

FIELD OF THE INVENTION

The invention relates to an actuating device, and in particular to an actuating device for a thrust reversal system and/or an airflow regulation system for a propulsion assembly of an aircraft.

STATE OF THE ART

Airplane propulsion assemblies generally comprise a turbine engine attached to a wing or to a fuselage of the airplane and a nacelle attached both to the wing or to the fuselage and on the turbine engine. In the case of a turbofan engine, the turbine engine includes a compressor, a combustion chamber, a high pressure turbine allowing the compressor to be driven and a low pressure turbine allowing a fan to be driven into rotation. The fan allows acceleration of a cold air flow circulating in a ring-shaped conduit defined between the turbine engine and the nacelle, in order to generate the required thrust for propulsion of the airplane.

Propulsion assemblies of airplanes generally comprise a thrust reversal system or TRAS (Thrust Reverse Actuation System) allowing reversal of the thrust in the landing phases in order to improve the braking capability of the airplane. Such a system comprises an assembly of moveable cowls actuated by associated actuators giving the possibility of temporarily obstructing the ring-shaped conduit and diverting the cold airflow towards the front of the nacelle, consequently generating a counter thrust which will be added to the braking of the wheels.

In the case of a so-called "door" thrust reversal system, the nacelle is equipped with removable cowls, (called "doors"), which pivot with respect to the structure of the nacelle between a retracted position in which they allow circulation of the airflow in the conduit towards the rear of the nacelle and a deployed position in which the flaps block the airflow and reorient it towards the front of the nacelle.

In the case of a so-called "grid" or "cascade" thrust reversal system, the nacelle is equipped with moveable cowls which slide with respect to the structure of the nacelle along rails between a retracted position in which they allow circulation of the cold airflow in the conduit towards the rear of the nacelle and a deployed position in which they uncover grids of deviation vanes in the ring-shaped conduit via flaps, the actuation of which is related to the movement of the cowls.

Generally, in either one of the cases, the moveable cowls are actuated by an assembly of dedicated actuators. Synchronization of the movement of the actuators is ensured by a system comprising flexible shafts allowing mechanical connection of the actuators with each other.

Further, the thrust reversal systems mandatorily comprise several locking devices with which untimely deployment of the cowls may be prevented during a flight phase. Among the locking devices which equip the thrust reversal systems, certain locking systems called "Primary lock systems" or PLS, act on the flexible shaft in order to block the flexible shaft in rotation.

Moreover, in order to optimize fuel consumption, the propulsion systems may also comprise a system for regulating the airflow or a VFN (Variable Fan Nozzle). Such a system allows regulation of the cold airflow circulating in the ring-shaped conduit according to the speed of the airplane. Such a system generally comprises moveable flaps actuated by actuators in order to vary the section of the circulation conduit.

SUMMARY OF THE INVENTION

An object of the invention is to reduce the bulkiness of the equipment associated with propulsion systems.

This object is achieved within the scope of the present invention by means of an actuation device, comprising:
  a first element,
  a second moveable element in translation with respect to the first element, and
  a locking device comprising a moveable locking latch between a deployed position and a retracted position, the latch being positioned with respect to the first element so that the latch is in a deployed position, the latch allows displacement of the second element with respect to the first element in a first displacement range and prevents displacement of the second element with respect to the first element in a second displacement range, and when the latch is in a retracted position, the latch allows displacement of the second element with respect to the first element in the second displacement range.

By means of the proposed actuation device, it is possible to design a propulsion assembly in which a same actuation device allows actuation of both the TRAS system and the VFN system. For example, it is possible to design an actuation device with a travel having a first deployment range (for example comprised between 0 and about 200 millimeters) in which the actuation device actuates the VFN system and a second deployment range (for example comprised between about 200 millimeters and 740 millimeters) in which the actuation device actuates the TRAS system.

The locking device allows movement of the actuation device in the first range while preventing a movement of the actuation device in the second range, thereby avoiding untimely deployment of the TRAS system.

The proposed actuation device may further have the following features:
  the first element is a shaft and the second element is a nut translationally moveable along the shaft, a rotation of the shaft with respect to the nut causing translation of the nut along the shaft,
  the latch comprises an abutment surface against which the second element may axially abut along a translation axis of the second element,
  the actuation device comprises a frame and the locking device comprises a rotatably mounted ring with respect to the frame, the ring cooperating with the latch so that a rotation of the ring with respect to the frame causes displacement of the latch between the retracted position and the deployed position,
  the ring and the latch comprise a ramp and a pin able to slide along the ramp during rotation of the ring,
  the locking device comprises an electromagnet, the electromagnet being able to be powered for driving the ring into rotation,
  the electromagnet surrounds the ring,
  the locking device comprises a locking limiter adapted for preventing rotation of the ring once the latch is in the retracted position,
  the locking limiter comprises a finger moveable between a disengaged position in which the finger allows rotation of the ring and an engaged position in which the finger prevents rotation of the ring, the finger is translationally moveable along an axis parallel to the translation axis of the second element, the finger comprises a widened portion able to be received in a housing made in the ring when the finger is in an engaged position for preventing rotation of the ring, the finger comprises a thinned portion able to slide in a groove made in the ring when the finger is in a disengaged position for allowing rotation of the ring, the locking limiter also comprises a first lever able to be urged by the second element during translation of the second element so as to displace the moveable finger in an engaged position when the actuation device is deployed, the locking limiter also comprises a second lever able to be urged by the second element during translation of the second element in order to displace the moveable finger in a disengaged position when the actuation device is retracted, the device comprises a plurality of latches, distributed around the translation axis of the second element, the device comprises a frame comprising a cylindrical internal wall defining a conduit in which the second element moves, the cylindrical wall comprising an orifice through which the locking latch protrudes when the locking latch is in a deployed position so as to be an obstacle to displacement of the second element, the second element is moveable relatively to the first element between an extreme retracted position and an extreme deployed position, the first displacement range being defined between the extreme retracted position and an intermediate position, the latch being an obstacle to translation of the second element beyond the intermediate position, and the second displacement range is defined between the intermediate position and the deployed extreme position.

The invention also relates to a propulsion assembly comprising:

an airflow regulation system, a thrust reversal system, and an actuation device as defined previously for selectively actuating the airflow regulation system and the thrust reversal system.

PRESENTATION OF THE DRAWINGS

Other features and advantages will further become apparent from the description which follows, which is purely illustrative and non-limiting. It should be read with reference to the appended figures, wherein.

DETAILED DESCRIPTION OF AN EMBODIMENT

Figure 1:
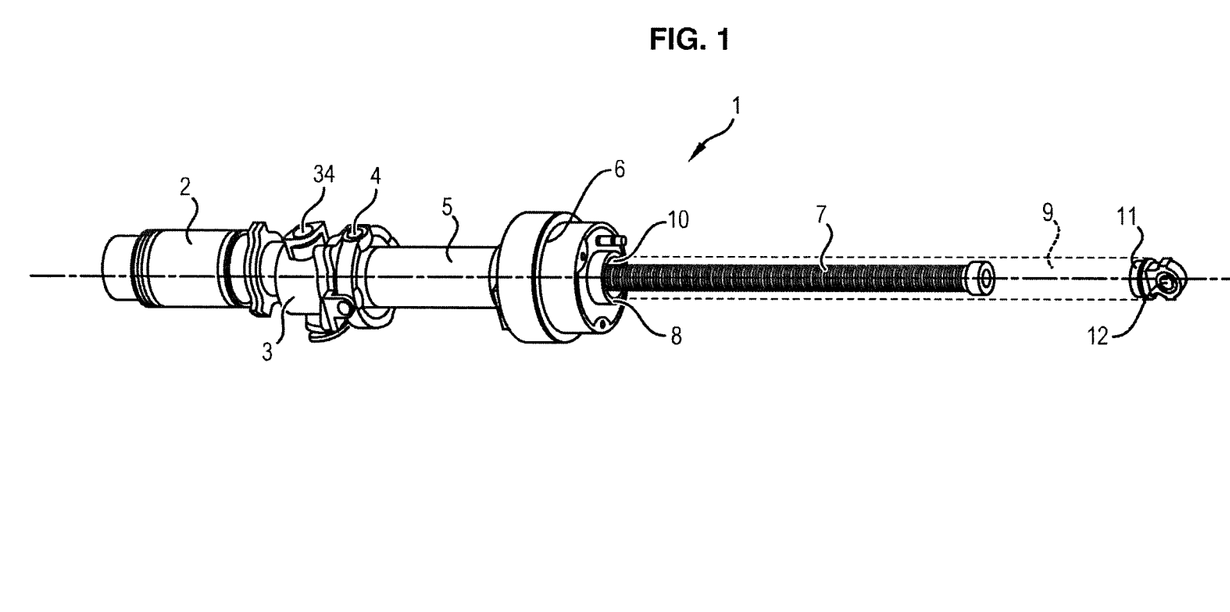
FIG. 1 schematically represents an actuation device according to an embodiment of the invention, FIG. 2 schematically illustrates, in a longitudinal sectional view, the locking device, FIGS. 3 to 5 schematically illustrate, in a transverse sectional view, the locking device, in the locked position, in the intermediate position and in the unlocked position respectively.

FIG. 1 schematically illustrates an actuation device 1 according to an embodiment of the invention.

The actuation device 1 generally comprises an electric motor 2, a reduction gear 3, a gimbal joint 4, an intermediate tube 5, a primary locking device 6 (primary lock system), a driving shaft 7, a nut 8 and an actuation tube 9.

The reducing gear 3 is connected at the inlet to an output shaft of the electric motor 2 and at the outlet to the shaft 7 for driving the actuation device 1. When the electric motor 2 is started, the electric motor 2 sets the driving shaft 7 into rotation via the reducing gear 3. The electric motor is controlled by a control unit and is adapted for selectively driving the driving shaft 7 into rotation depending on a first direction of rotation and depending on a second direction of rotation, opposite to the first direction.

The reducing gear 3 further comprises an inlet 34 intended to be connected to a flexible shaft for synchronization of the device 1 with other identical actuation devices arranged around the nacelle.

The intermediate tube 5 is connected to a frame of the reducing gear 3 via the gimbal joint 4.

The driving shaft 7 is rotatably mounted with respect to a frame on which the electric motor 2 and reducing gear 3 are attached, around a longitudinal axis of rotation X coinciding with a translation axis of the actuation tube (which is also the deployment axis of the actuation device). The driving shaft 7 is a threaded shaft having an external cylindrical surface in which is made a helicoidal groove. The driving shaft 7 extends from the reducing gear 3, inside the intermediate tube 5 and through the primary locking device 6.

The intermediate tube 5 surrounds the driving shaft 7 and extends between the gimbal joint 4 and the locking device 6. The locking device 6 is attached on the intermediate tube 5 to one end of the latter.

The nut 8 is mounted around the driving shaft 7. The nut 8 is mounted so as to be translationally moveable along the driving shaft 7. The nut 8 comprises an internal surface in which is made a helicoidal groove, adapted for cooperating with the helicoidal groove of the driving shaft 7 so that a rotation of the driving shaft 7 with respect to the nut 8 concomitantly causes translation of the nut 8 along the driving shaft 7, along a translation direction parallel to the axis of rotation X of the driving shaft 7.

The actuation tube 9 has a first end 10 connected to the nut 8 and a second free end 11 intended to be connected via a ball joint connection 12 to a moveable part of the nacelle (flap or cowl) controlling the actuation of an airflow regulation system and of a thrust reversal system. The actuation tube 9 is mounted so as to be secured to the nut 8. Thus, starting the electric motor 2 causes translation of the actuation tube 9 between a retracted position (position of the start-of-travel) and a deployed position (end-of-travel position).

The gimbal joint 4 gives the possibility of compensating for the alignment defects between the output shaft of the electric motor 2 and the end 11 of the actuation tube 9 along its travel.

Figure 2:
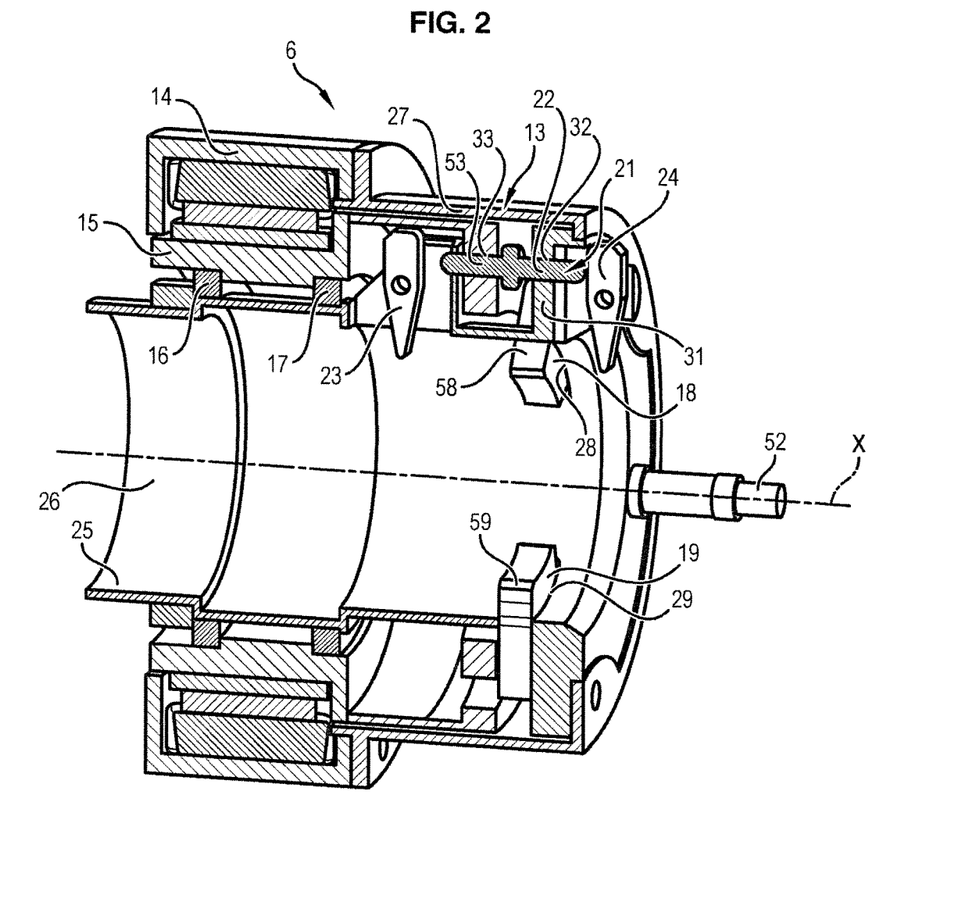

FIG. 2 schematically illustrates, in a longitudinal sectional view, the primary locking device 6.

The locking device 6 comprises a frame 13, an electromagnet 14, a ring 15, two ball bearings 16 and 17, locking latches 18 to 20, and a locking limiter 21, the locking limiter 21 including a moveable finger 22, a first lever 23 and a second lever 24.

The frame 13 comprises an internal cylindrical wall 25 surrounding the driving shaft 7 and defining a channel 26 for letting through the nut 8, an external cylindrical wall 27 and a transverse wall 31 connecting the internal wall 25 and the external wall 27. The internal wall 25 has a plurality of orifices 28 and 30, through which the locking latches 18 to 20 may protrude into the channel 26 in order to prevent displacement of the nut 8.

The electromagnet 14 has a ring shape. The electromagnet 14 is mounted so as to be secured to the frame 13. More specifically, the electromagnet 14 is mounted so as to be secured to the external wall 27 and extends around the internal wall 25.

The ring 15 extends around the internal wall 25 of the frame 13. More specifically, the ring 15 is laid out between the internal wall 25 and the electromagnet 14. The ring 15 is rotatably mounted with respect to the frame 13 via ball bearings 16 and 17 and is able to be driven into rotation with respect to the frame 13 around the axis of rotation X of the driving shaft 7 under the effect of a magnetic field generated by the electromagnet 14.

The latches 18 to 20 are pivotally mounted on the transverse wall 31 of a frame 13. The latches 18 to 20 are distributed around the axis of rotation X of the driving shaft 7, with constant angular distance between two successive latches. Each latch 18 to 20 is pivotally mounted around a respective axis 38 to 40. The axes of rotation 38 to 40 of the latches are positioned at a distance and parallel to the axis of rotation X of the driving shaft 7. Each latch 18 to 20 is moveable between a retracted position in which the latch allows passing of the nut 8 and a deployed position in which the latch extends through an associated orifice 28 to 30 of the internal wall 25 and protrudes into the channel 26. Each latch 18 to 20 has an abutment surface 58 to 60 extending along a plane transverse to the translation direction X of the nut 8 against which the nut 8 may abut in the case of displacement of the nut out of the allowed displacement range. In the deployed position, the latches 18 to 20 are thus an obstacle to the displacement of the nut 8 beyond the abutment surfaces 58 to 60 of the latches 18 to 20.

The moveable finger 22 is mounted so as to be free in translation with respect to the frame 13 along a translation direction parallel to the axis of rotation X of the driving shaft 7. The finger 22 extends both into an orifice 32 provided in the transverse wall 31 of the frame 13 and into a lumen 33 made in the rotary ring 15. Further, the finger 22 has a thinned portion 53 and a widened portion 54 forming a shoulder 55.

The first lever 23 and the second lever 24 are mounted so as to be free in rotation with respect to the frame 13 along an axis of rotation perpendicular to the translation direction X of the nut 8. The levers 23 and 24 are laid out on either side of the moveable finger 22, so that each lever 23, 24 is able to urge the moveable finger 22 in one direction parallel to the X axis and in a second direction opposite the first direction, respectively for displacing the moveable finger 22 in the first direction and in the second direction, respectively. Each lever 23, 24 has an end 36, 37 extending in the channel 26 on the passing of the nut 8. Thus, when the nut 8 passes into the channel 26, the nut 8 will successively push the levers 23, 24, which has the effect of displacing the moveable finger 22 in the first direction or in the second direction depending on the displacement direction of the nut 8.

Figure 3:
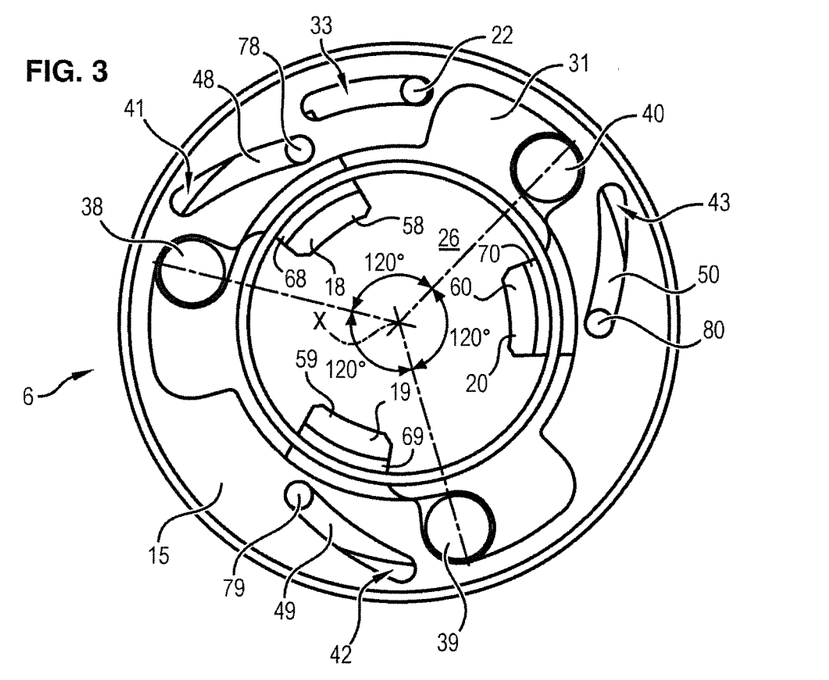
Figure 4:
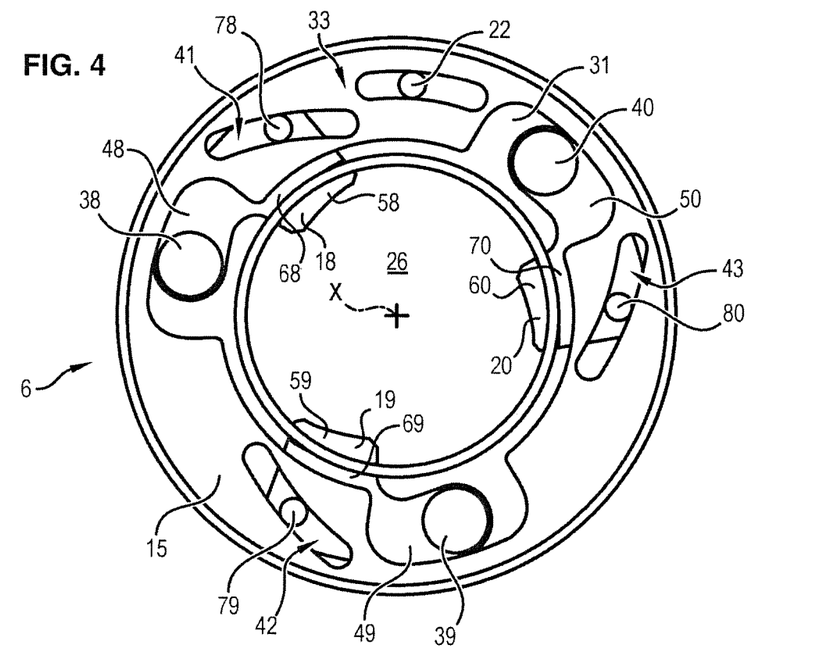
Figure 5:
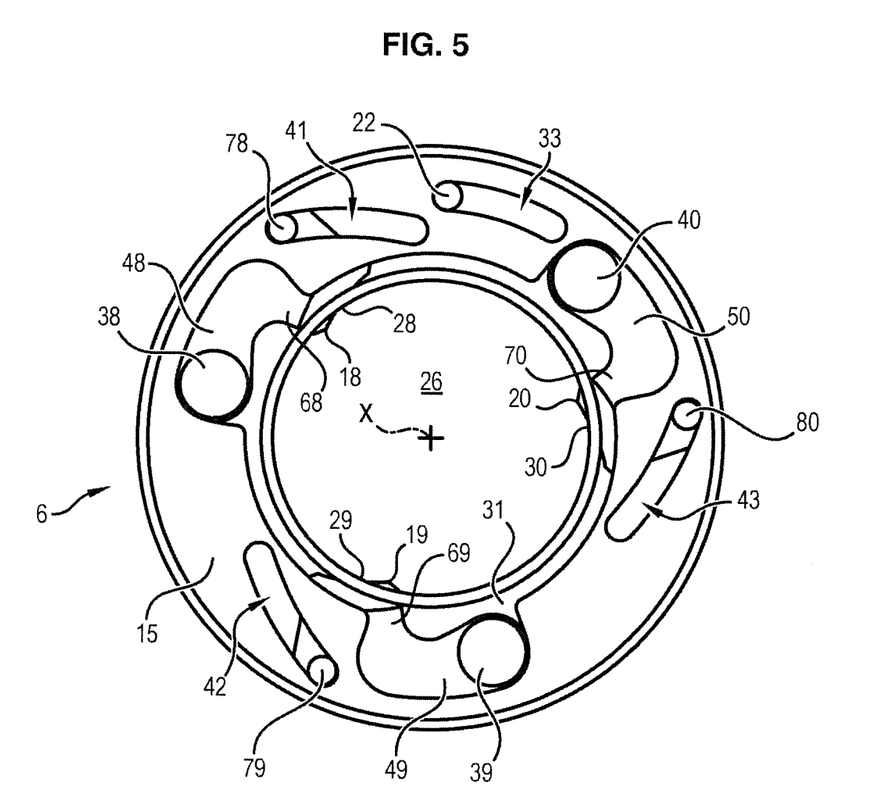

FIGS. 3 to 5 schematically illustrate in a transverse sectional view, the primary locking device 6 in various configurations corresponding to different positions of the rotary ring 15.

As this is illustrated in these figures, the latches 18 to 20 are identical with each other and are distributed around the axis of translation X of the nut 8, with constant angular distance between two successive latches. More specifically, the latches 18 to 20 are three in number and their axis of rotation 38 to 40 are spaced apart by 120 degrees between them. Each latch 18 to 20 comprises an arm 48 to 50 rotatably mounted on the frame 13 around a respective axis of rotation 38 to 40 and a blocking tooth 68 to 70 extending at a free end of the arm. Further, each latch 18 to 20 comprises a guiding pin 78 to 80 laid out at a distance from the axis of rotation of the latch.

The rotary ring 15 comprises a plurality of elongated lumens 41 to 43 in the form of an arc. Each lumen 41 to 43 receives a respective guiding pin 78 to 80 which may slide in the lumen. The lumens 41 to 43 each extend between a first end closer to the axis of rotation X of the driving shaft and a second end further away from the axis of rotation X than the first end, thereby defining guiding ramps for the pins 78 to 80. The pins 78 to 80 and the ramps 41 to 43 cooperate with each other so that a rotation of the ring 15 with respect to the frame 13 around the axis of rotation X causes rotation of each latch 18 to 20 with respect to the frame 13 around its respective axis of rotation 38 to 40 as this is illustrated in FIGS. 3 to 5.

The rotary ring 15 also comprises an additional lumen 33 receiving a moveable finger 22. The moveable finger 22 is able to slide in the lumen during rotation of the ring 15 in order to allow rotation of the ring.

In FIG. 3, the locking latches 18 to 20 are in a deployed position. In this position, the teeth 68 to 70 of the latches fully protrude into the channel 26 through the orifices 28 to 30 made in the internal wall 25 of the frame 13 and prevent translation of the nut 8 beyond the locking latches 18 to 20. Each pin 78 to 80 abuts against the first end of the associated lumen 41 to 43.

In FIG. 5, the locking latches 18 to 20 are in a retracted position. In this position, the teeth 68 to 70 are fully away from the deployment axis X and clear the passage for the nut 8 through the channel 26. Each pin 78 to 80 abuts against the second end of the associated lumen 41 to 43.

In FIG. 4, the locking latches 18 to 20 are in an intermediate position between the deployed position and the retracted position. Each pin 78 to 80 is halfway between the ends of the corresponding lumen 41 to 43.

Figure 6:
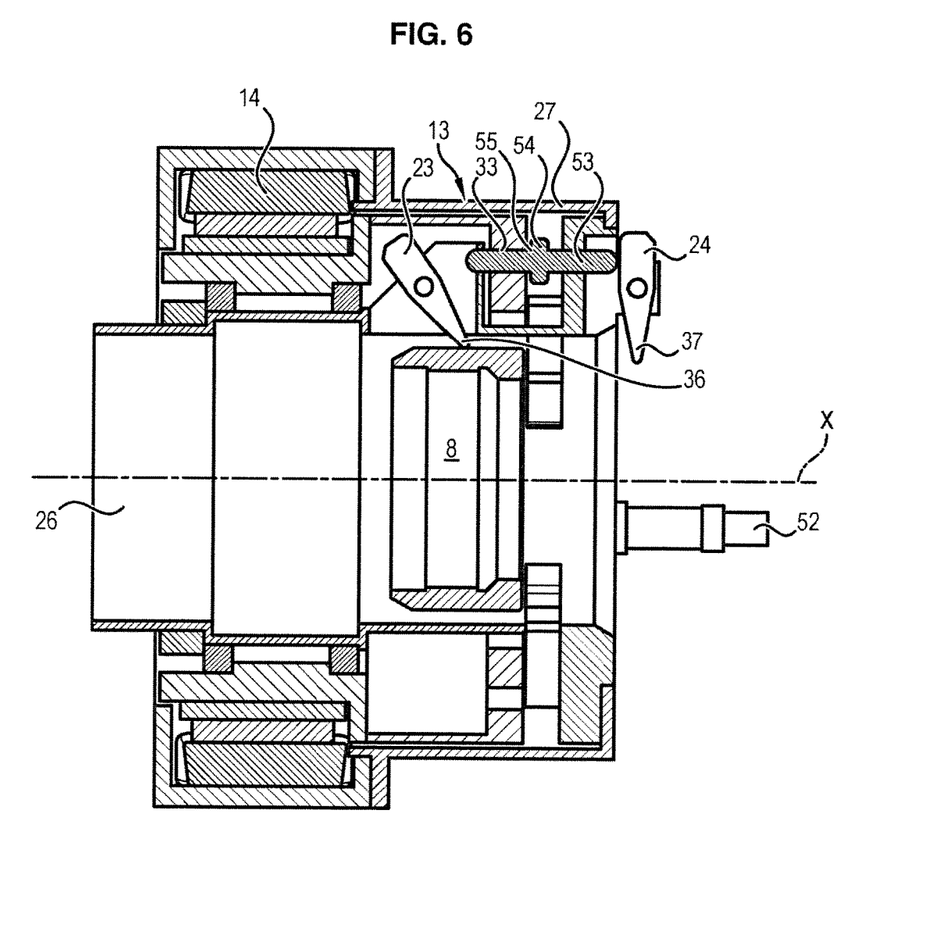
FIGS. 6 and 7 illustrate the passing of the nut beyond the locking latches, FIG. 8 schematically illustrates the ring and the moveable finger of the locking device, FIG. 9 schematically illustrates various operating ranges of the actuation device.
Figure 7:
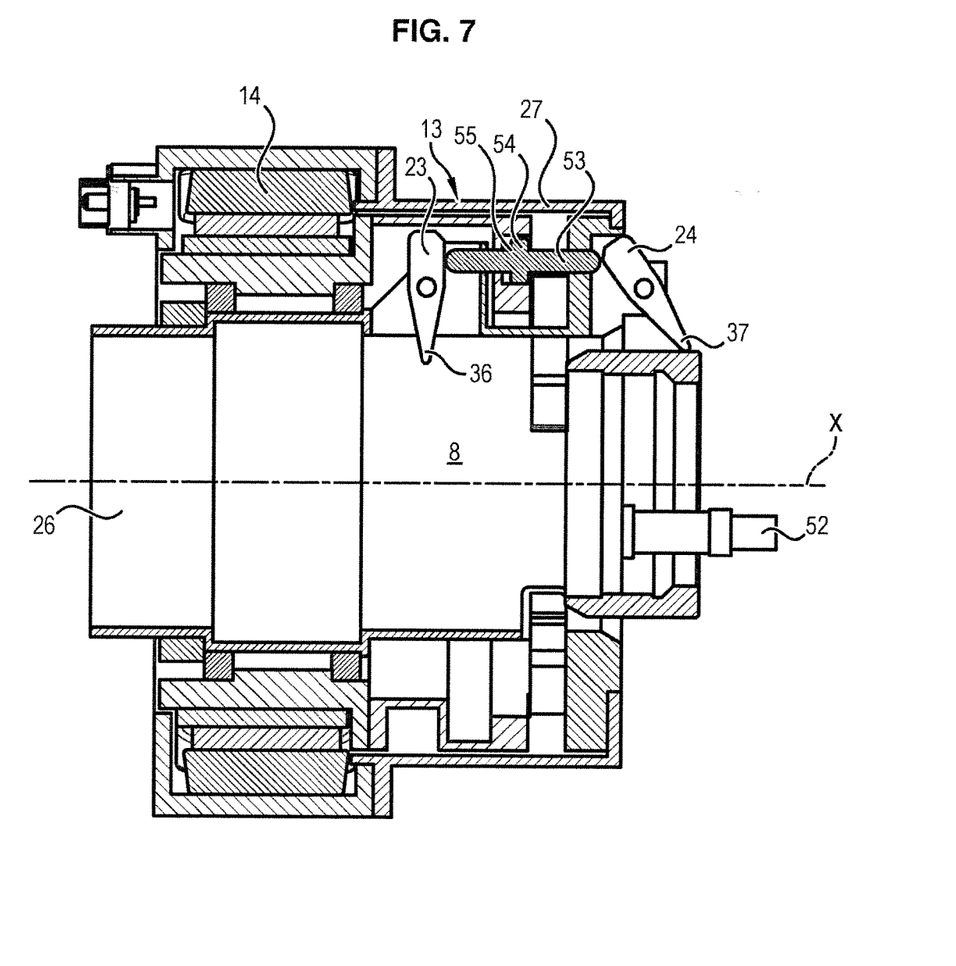

FIGS. 6 and 7 illustrate the passing of the nut 8 beyond the locking latches 18 to 20.

In FIG. 6, the actuation device 1 is being deployed. The nut 8 is moved in translation towards the right in FIG. 6 (direction of deployment of the actuation device). The nut 8 first encounters on its passage the first lever 23. During its displacement, the nut 8 pushes the end 36 of the first lever 23, which has the effect of driving the first lever 23 into rotation.

In FIG. 7, once the latches 18 to 20 are in a retracted position, the nut 8 continues its displacement and encounters on its passage the second lever. During its displacement, the nut 8 pushes the end 37 of the second lever 24 which has the effect of driving the second lever 24 into rotation. During its rotation, the second lever 24 will push the moveable finger 22, which has the effect of moving the finger 22 in an engaged position with the ring 15.

Figure 8:
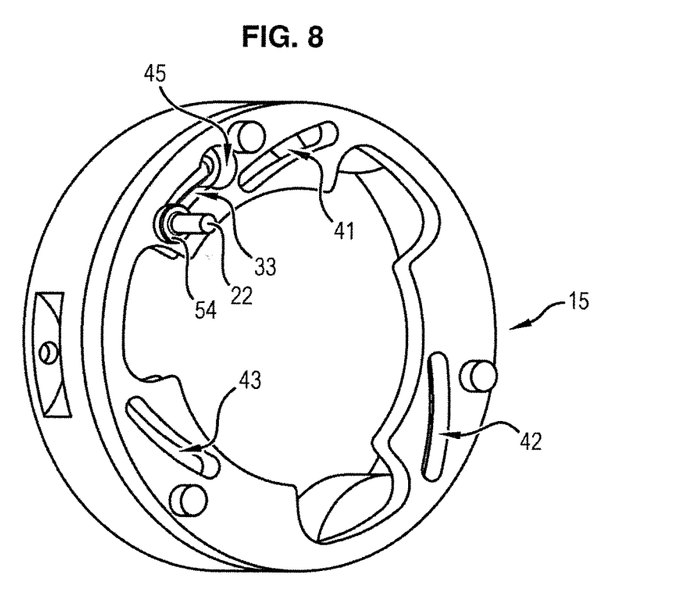

As this is illustrated in FIG. 8, the rotary ring 15 comprises a housing 45 laid out at one end of the lumen 33. During the rotation of the second lever 24, the finger 22 is pushed in the housing 45 by the second lever 24 so that the widened portion 54 of the finger 22 is received in the housing 45 and prevents any rotation of the ring 15. In this position, the locking device 6 is therefore maintained in an unlocked configuration.

During operation, the locking device 6 is initially in a locked configuration. The latches 18 to 20 are in a deployed position so that the nut 8 can only be displaced in translation over a restricted range, this range being limited by the position of the locking latches 18 to 20. In this restricted range, the actuation device 1 only actuates the airflow regulation system (VFN system).

When the pilot orders deployment of the thrust reversal system (TRAS), a control system triggers powering of the electromagnet 14, which has the effect of driving the ring 15 into rotation with respect to the frame 13 around the axis of rotation X of the driving shaft 7. The rotation of the ring 15 with respect to the frame 13 causes retraction of the latches 18 to 20, so as to allow displacement of the nut 8 in a range extending beyond the latches 18 to 20, in which the actuation device controls the thrust reversal system.

Further, the control system triggers the powering of the electric motor 2 in order to drive into rotation the driving shaft 7 in a first direction of rotation. The rotation of the driving shaft 7 with respect to the nut 8 causes translation of the nut 8 along the driving shaft 7 in the deployment direction of the actuation device. During the displacement of the nut 8, at the start-of-travel, the nut 8 actuates the second lever, which has the effect of displacing the moveable finger 22 in an engaged position so as to prevent any rotation of the ring 15. The locking device 6 is thus maintained in an unlocked configuration as long as the thrust reversal system is not totally retracted.

When reversal of the thrust is no longer necessary, the pilot orders retraction of the thrust reversal system. The control system triggers the powering of the electric motor 2 in order to drive into rotation the driving shaft 7 in a second direction of rotation, opposite to the first direction of rotation. The rotation of the driving shaft 7 with respect to the nut 8 causes translation of the nut 8 along the driving shaft 7 in the retraction direction of the actuation device. During the displacement of the nut 8, at the end-of-travel, the nut 8 actuates the first lever, which has the effect of displacing the moveable finger 22 in a disengaged position, out of the housing 45, so as to allow rotation of the ring 15.

The ring 15 is displaced in rotation with respect to the frame 13 around the axis of rotation of the driving shaft 7 under the effect of a return member (for example a spring). The rotation of the ring 15 with respect to the frame 13 causes deployment of the latches 18 to 20, so as to restrict the displacement of the nut 8 in a range in which the actuation device exclusively controls the flow regulation system, this range being delimited by the position of the latches 18 to 20.

Figure 9:
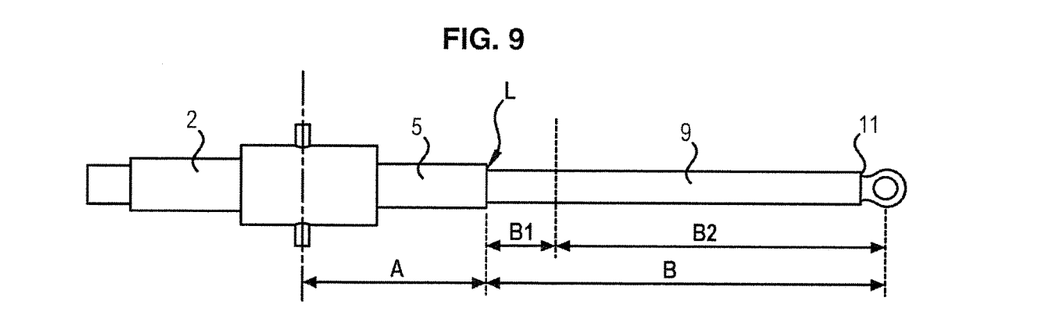

FIG. 9 schematically illustrates various operating ranges of the actuation device.

The nut 8 is moveable with respect to the driving shaft 7 between a retracted extreme position and a deployed extreme position. The displacement of the nut 8 from the retracted extreme position to the deployed extreme position, causes lengthening of the actuation device along the deployment axis of the actuation device, i.e. the X axis.

The first range A for displacement of the nut along the driving shaft is delimited by the position L of the locking latches. The displacement of the nut in this first range has the effect of actuating the airflow regulation system (VFN). This first range A corresponds to a deployment of the actuation device for example comprised between 0 and about 200 millimeters.

The second range B for displacement of the nut along the driving shaft can only be attained by the nut when the locking latches are in a retracted position, so that the nut may be displaced beyond the position L of the latches. This second range B corresponds to deployment of the actuation device for example comprised between about 200 millimeters and about 740 millimeters.

The second range B is divided into two sub ranges B1 and B2. The displacement of the nut in the sub-range B2 has the effect of actuating the thrust reversal system (TRAS). The sub-range B2 is a transitional sub-range between actuation of the VFN system and that of the TRAS system.

As this will have been understood, the proposed actuation device 1 includes a locking device 6 giving the possibility of preventing untimely actuation of the thrust reversal system during flight phases while allowing actuation of the airflow regulation system.

Further, in the case of absence of an electric power supply, the locking device 6 cannot be unlocked so that the thrust reversal system cannot be deployed.

Finally, supplying the locking device 6 with electric power is only necessary upon unlocking. By means of the locking limiter, the locking device 6 is then maintained in an unlocked configuration as long as the thrust reversal system is not totally retracted, even in the case of an electric current failure.

Once the thrust reversal system is retracted, the locking device 6 is again automatically locked.

The invention claimed is:

1. An actuation device, comprising:
   a first element (7),
   a second translationally moveable element (8) with respect to the first element (7),
   a frame (13), and
   a locking device (6) comprising a locking latch (18, 20) moveable between a deployed position and retracted position, the latch (18-20) being positioned with respect to the first element (7) so that when the latch (18-20) is in a deployed position, the latch (18-20) allows displacement of the second element (8) with respect to the first element (7) in a first displacement range (A) and prevents displacement of the second element (8) with respect to the first element (7) in a second displacement range (B), and when the latch (18-20) is in a retracted position, the latch (18-20) allows displacement of the second element with respect to the first element (7) in the second displacement range (B), the locking device (6) comprising a ring (15) rotatably mounted with respect to the frame (13), the ring (15) cooperating with the latch (18-20) so that a rotation of the ring (15) with respect to the frame (13) causes displacement of the latch between the retracted position and the deployed position.

2. The device according to claim 1, wherein the first element (7) is a shaft and the second element (8) is a nut mounted so as to be translationally moveable along the shaft, a rotation of the shaft with respect to the nut causing translation of the nut along the shaft.

3. The device according to claim 1, wherein the latch (18, 20) comprises an abutment surface (58-60) against which the second element (8) may axially abut according to a translation axis of the second element (8).

4. The device according to claim 1, wherein the ring (15) and the latch (18-20) comprise a ramp (41-43) and a pin (78-80) able to slide along the ramp during rotation of the ring (15).

5. The device according to claim 1, wherein the locking device (6) comprises an electromagnet (14), the electromagnet (14) being able to be powered for driving the ring (15) into rotation.

6. The device according to claim 5, wherein the electromagnet (14) surrounds the ring (15).

7. The device according to claim 1, wherein the locking device (6) comprises a locking limiter (21) adapted for preventing rotation of the ring (15) once the latch (18-20) is in a retracted position.

8. The device according to claim 7, wherein the locking limiter (21) comprises a finger (22) moveable between a disengaged position in which the finger (22) allows rotation of the ring (15) and an engaged position in which the finger (22) prevents rotation of the ring (15).

9. The device according to claim 8, wherein the finger (22) is translationally moveable along an axis parallel to the translation axis of the nut (8).

10. The device according to claim 8, wherein the finger (22) comprises a widened portion (24) able to be received in a housing (45) made in the ring (15) when the finger (22) is in an engaged position for preventing rotation of the ring (15).

11. The device according to claim 8, wherein the finger (22) comprises a thinned portion (53) able to slide in a through hole (33) made in the ring (15) when the finger (22) is in a disengaged position for allowing rotation of the ring (15).

12. The device according to claim 8, wherein the locking limiter (21) also comprises a first lever (23) able to urged by the second element (8) during translation of the second element (8) for displacing the moveable finger (22) in an engaged position when the actuation device is deployed.

13. The device according to claim 8, wherein the locking limiter (21) also comprises a second lever (24) able to be urged by the second element (8) during a translation of the second element (8) for displacing the moveable finger (22) in a disengaged position when the actuation device is retracted.

14. The device according to claim 1, comprising a plurality of latches (18-20), distributed around the translation axis of the second element (8).

15. The device according to claim 1, wherein the frame (13) comprises a cylindrical internal wall (25) defining a conduit in which the second element (8) moves, the wall (25) comprising an orifice (28-30) through which the locking latch (18-20) protrudes when the latch (18-20) is in a deployed position so as to prevent the displacement of the second element (8).

16. The device according to claim 1, wherein the second element (8) is moveable with respect to the first element between a retracted extreme position and a deployed extreme position, the first displacement range (A) being defined between the retracted extreme position and an intermediate position, the latch (18-20) preventing translation of the second element (8) beyond the intermediate position, and the second displacement range (B) is defined between the intermediate position and the deployed extreme position.

* * * * *